United States Patent
Verbiest

(10) Patent No.: US 6,452,733 B2
(45) Date of Patent: Sep. 17, 2002

(54) LENS FIXTURE

(75) Inventor: Rik Verbiest, Eeklo (BE)

(73) Assignee: Barco, nv, Kortrijk (BE)

( * ) Notice: Subject to any disclaimer, the term of this patent is extended or adjusted under 35 U.S.C. 154(b) by 0 days.

(21) Appl. No.: 09/879,241

(22) Filed: Jun. 11, 2001

(30) Foreign Application Priority Data

Jun. 9, 2000 (BE) .......................................... 2000/0375

(51) Int. Cl.[7] .............................................. G02B 7/02
(52) U.S. Cl. ...................................... 359/827; 359/828
(58) Field of Search ................................ 359/810, 811, 359/819, 827, 828, 830

(56) References Cited

U.S. PATENT DOCUMENTS

| | | | |
|---|---|---|---|
| 4,062,030 A | 12/1977 | Starp | 396/531 |
| 4,249,799 A | 2/1981 | Iglesias | 359/827 |
| 5,812,328 A * | 9/1998 | Suzuki et al. | 359/811 |
| 6,286,963 B1 * | 9/2001 | Nelson | 359/506 |

FOREIGN PATENT DOCUMENTS

GB  1 590 752  6/1981

* cited by examiner

*Primary Examiner*—Georgia Epps
*Assistant Examiner*—Saeed Seyrafi
(74) *Attorney, Agent, or Firm*—Bacon & Thomas, PLLC

(57) ABSTRACT

Lens fixture for removably attaching a lens at an apparatus, which consists at least of, on one hand, a seat at the lens or at an adapter piece and, on the other hand, an attachment mechanism at the apparatus, which mechanism at least is composed of a carrier structure with an opening for providing the lens or adapter piece therein, and an elastically working pressing system comprising one or more substantially radially working pressing elements, which pressing system can cooperate with said seat of the lens, the adapter piece, respectively, and, in coupled condition of the lens or the adapter piece, exerts a permanent axial pressure force onto this latter, wherein the lens fixture comprises pressing elements formed by spring wire.

18 Claims, 7 Drawing Sheets

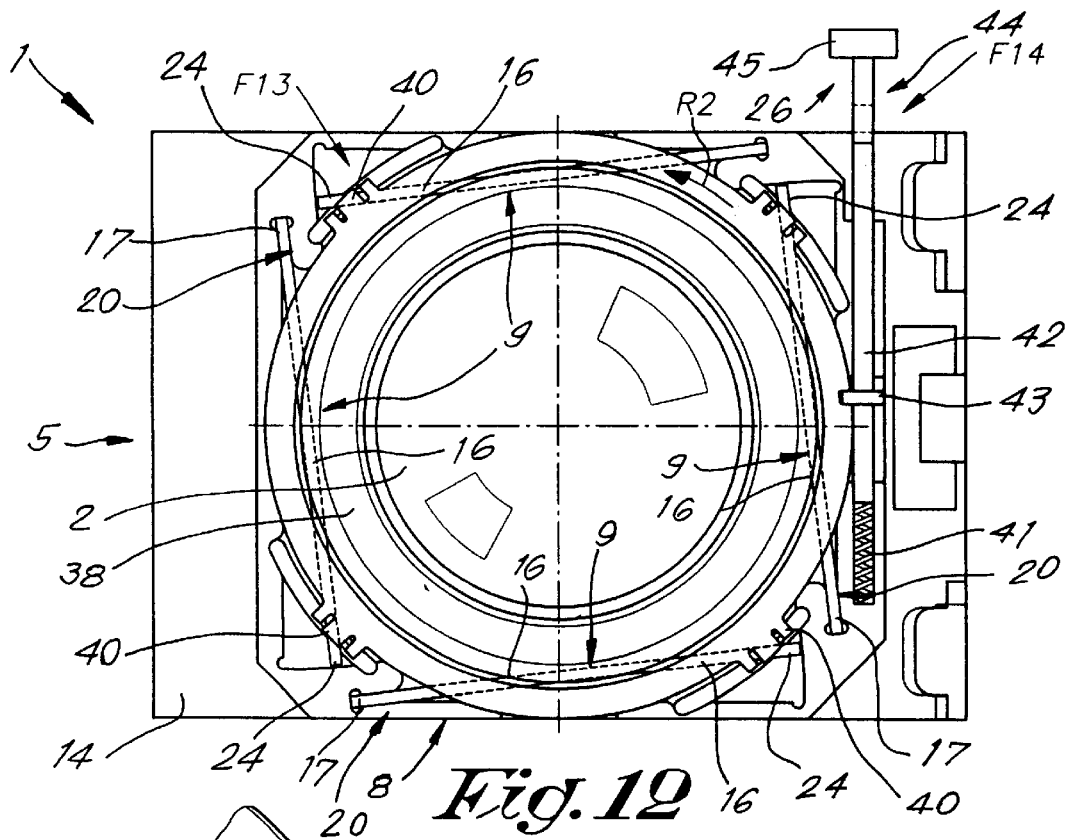
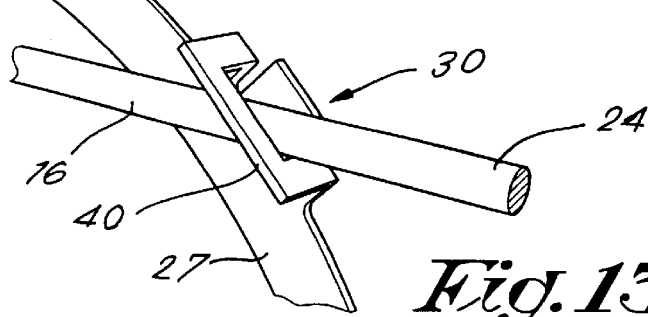
Fig.12
Fig.13
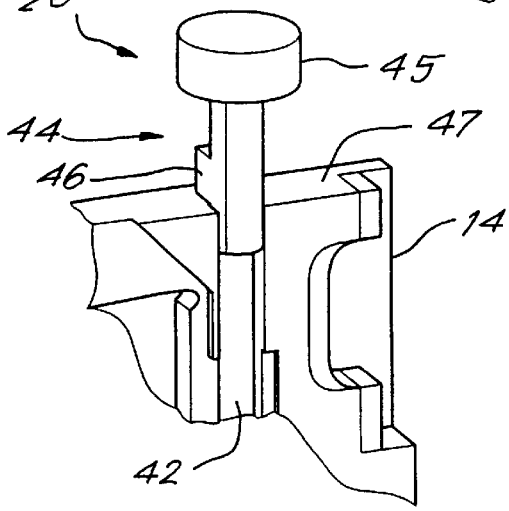
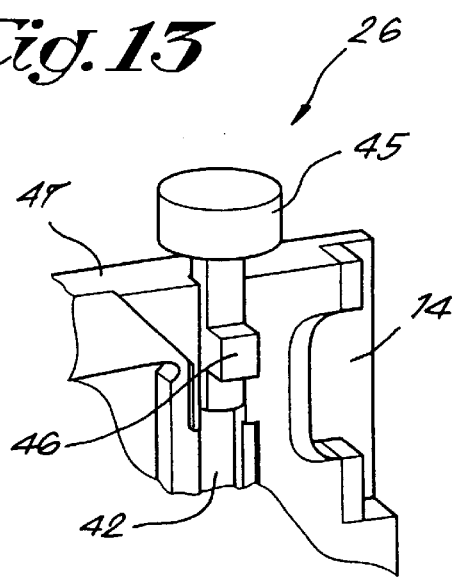
Fig.14    Fig.15

LENS FIXTURE

BACKGROUND OF THE INVENTION

This invention relates to a lens fixture, more particularly a fixture for removably attaching a lens at an apparatus.

In the first place, the invention is intended for fixing a lens in a projector; it is, however, clear that it can also be applied in other devices.

Already, different kinds of lens attachment systems are known. A first classical system consists of a screw thread connection which, however, shows the disadvantage that it is cumbersome to attach the lens, unscrew it, respectively. A second classical system consists of a bayonet coupling, whereby the lens has to be inserted axially into a seat and subsequently has to be rotated over a well-defined angle. Such bayonet coupling, however, does not offer a large rigidity, which, in the first place, forms a disadvantage with large lenses, as these, due to the influence of their weight, are no longer kept at their location in an efficient manner.

Apart therefrom, other lens attachment systems are known, whereby use is made of a so-called lens port, or of fins situated around the lens. These systems show the disadvantage that they are rather cumbersome in use.

From the patent documents U.S. Pat. No. 4,249,799, U.S. Pat. No. 4,062,030 and GB 1.590.752, fixtures are known, amongst others, lens fixtures, with radially movable pressing elements, whereby in coupled condition also a permanent axial pressing force is created. The systems disclosed in these documents apply lever systems and the like, which have the disadvantage that they take up a lot of space. Moreover, they are provided with helicoidal springs, the tension force of which mostly is rather limited.

SUMMARY OF THE INVENTION

The present invention aims at a lens fixture which allows to attach a lens in an efficient manner very stable in an apparatus, even in the case of large lenses, more particularly lenses with a weight of several kilograms, whereby this lens can be attached in the apparatus, as well as removed therefrom, in a smooth manner.

To this aim, the invention relates to a lens fixture for removably attaching a lens at an apparatus, which consists at least of, on one hand, a seat at the lens or at an adapter piece and, on the other hand, an attachment mechanism at the apparatus, which mechanism at least is composed of a carrier structure with an opening for providing the lens or adapter piece therein, and an elastically working pressing system comprising one or more substantially radially working pressing elements, which pressing system can cooperate with said seat of the lens, the adapter piece, respectively, and, in coupled condition of the lens or the adapter piece, exerts a permanent axial pressure force onto this latter, with the characteristic that the lens fixture comprises pressing elements formed by spring wire.

By using one or more radially movable pressing elements, a very efficient clamping attachment is obtained.

Due to the permanent axial pressing force, the important advantage is created that the lens, once clamped, always remains in the same position and no longer can shift in axial direction.

By applying spring wire for the pressing element, pressing elements, respectively, in other words, applying hereto wire-shaped elements which, for example, are made of spring steel, amongst others, the advantages are obtained that said elements take up little space and therefore easily can be mounted around the opening in which the lens is provided, that they can be fixed in the carrier structure in a simple manner, for example, by providing them in a small seat, and that, notwithstanding their small dimension, can provide rather a large tension.

Preferably, the spring wires are positioned substantially tangential around the lens, or at least around the opening in which the lens is provided. Hereby, each respective spring wire, at least in active condition, substantially is held in the proximity of two extremities and therefore can be bent out elastically in the middle, according to a direction radial to the opening in which the lens is provided.

Preferably, the seat at the lens consists of one or more recesses. In the most preferred form of embodiment, this seat extends along the entire circumference of the lens.

Practically, it is preferred that the seat shows a contact surface which extends in an inclined manner in respect to the axial direction of the lens. As a result of the effect of the radially movable pressing element, the radially movable pressing elements, respectively, onto each pertaining contact surface, in this way the creation of a radial as well as an axial force component is obtained in a constructively simple manner, as a result of which the lens is enclosed laterally and held, as well as pressed-on axially, preferably against stop parts especially provided to this purpose.

According to a particular characteristic of the invention, the aforementioned contact surface extends in respect to the vertical at an angle which is smaller than the frictional angle determined by the materials and the surface condition of, on one hand, said contact surface and, on the other hand, the pressing element cooperating therewith. In this manner, a self-braking effect is created, as a result of which this lens, regardless of the weight thereof, will not be loosened by itself.

In practice, the aforementioned angle will be smaller than 30° and even better will be of the order of magnitude of 15°.

In a preferred form of embodiment, several pressing elements are provided along the circumference, which, for example, are distributed along the circumference in a rotationally symmetric manner. In the most preferred form of embodiment, this will be three or four in number. By using at least three pressing elements, a well-balanced clamping will be guaranteed, whereas by using preferably maximum four pressing elements, a constructively rather simple mounting of these pressing elements in the carrier structure can be provided for.

According to another preferred characteristic of the invention, the unit has means which allow a snapping-on of the lens in the carrier structure against the force exerted by the elastically working pressing system. As a result of this, the lens can be provided in the apparatus in a simple manner by sliding it into the aforementioned opening of the carrier structure, whereby it then automatically becomes attached.

Although it is not excluded to realize the lens fixture in such a manner that the lens can be removed exclusively by means of a tool or of another accessory, it is preferred that said attachment mechanism comprises a control mechanism with which the pressing element, the pressing elements, respectively, can be brought into at least two positions, to wit an inactive position whereby the lens can be removed from said opening, and an active position whereby, in any case, if the lens is provided in the attachment mechanism, the pressing element, the pressing elements, respectively, hold the lens and, more particularly, exert a force upon the lens. Due to the control mechanism, the lens can be loosened from said carrier structure in a particularly simple manner, such by operating the control mechanism in a suitable manner and subsequently sliding the lens axially out of the carrier structure.

In a practical form of embodiment, the control mechanism then will comprise a movable element, provided with means for the displacement thereof, whereby this movable element cooperates with the movable pressing element, pressing elements, respectively, and can move the pressing element, pressing elements, respectively, radially outward, such that the lens can be freely removed from the opening.

According to a particular aspect, which, according to the present invention, is not limited to pressure elements consisting of spring wires, but also can applied with lens fixtures having pressing means realized in a different manner, the control mechanism comprises elastic means which force the control mechanism into a well-defined position, as well comprises a locking system with which it can be locked, against the force of said elastic means, in a position in which the pressing element, pressing elements, respectively, are in one of the aforementioned positions, either the inactive position or the active position. With a locking in inactive position, the advantage is obtained that the control mechanism can be permanently put into inactive position, as a result of which the operator has both hands free for removing the lens, which is particularly advantageous in case of heavy-weight lenses of several kilograms. With a locking in active position, it is obtained, amongst others, that a careless uncoupling is prevented.

Other preferred characteristics are described in the detailed description and the dependent claims. In general, thanks to the invention described in the aforegoing, the following advantageous features are obtained:

- a perfect positioning of the lens against the apparatus, without play;
- a very rigid connection, suitable for heavy lenses;
- a simple lens body, as the housing of the lens can be manufactured exclusively by lathe work;
- a lens fixture which allows that the lens is not bound to an orientation, although, according to a variant, it is possible to provide such orientation;
- the insertion of the lens can be performed with two hands, as no separate operations have to be performed;
- the removal of the lens is very simple, as well;
- the unit does not comprise any delicate or fragile parts and can easily be made of wear and tear-resistant materials;
- the fixture is self-centering.

It is noted that, according to the invention, said seat either is provided at the housing of the lens itself, or at an adapter piece in which a lens can be attached.

Evidently, the invention also relates to lenses and adapter pieces equipped with special provisions, in particular with a seat such as described in the aforegoing, which allow that such lens or adapter piece can be attached in an apparatus by means of a lens fixture as described in the aforegoing.

It is also evident that the invention also relates to apparatuses provided with an attachment mechanism as described in the aforegoing. According to the invention, by the term 'apparatus' a complete apparatus as well as a part of an apparatus as well as a constructive part which can be attached at an apparatus, such as a projector or such, has to be understood.

BRIEF DESCRIPTION OF THE DRAWINGS

With the intention of better showing the characteristics of the invention, hereafter, as examples without any limitative character, several preferred forms of embodiment are described, with reference to the accompanying drawings, wherein:

FIG. 12, in mounted condition, represents a view according to arrow F12 in FIG. 11;

FIGS. 13 and 14, in perspective, represent two detailed views of the parts indicated by arrows F13, F14, respectively, in FIG. 12;

FIG. 15 represents the part of FIG. 14 in another position;

DESCRIPTION OF THE PREFERRED EMBODIMENTS

Figure 1:
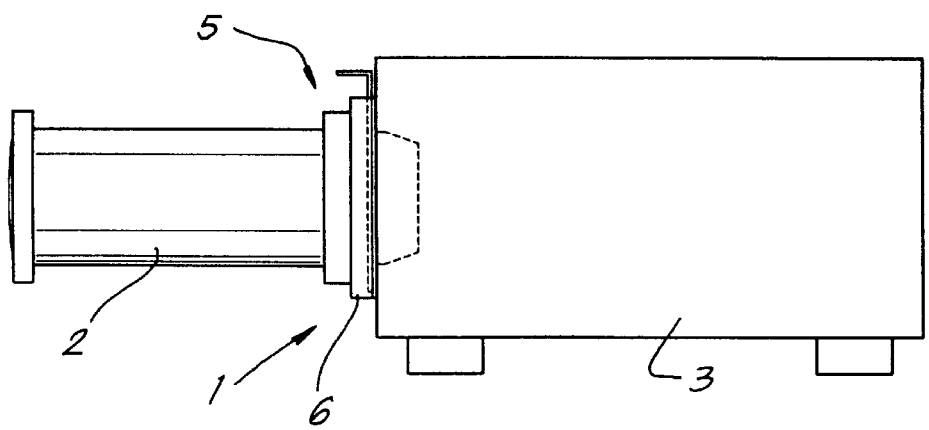
FIG. 1 schematically represents a projector equipped with a lens fixture according to the invention.
Figure 5:
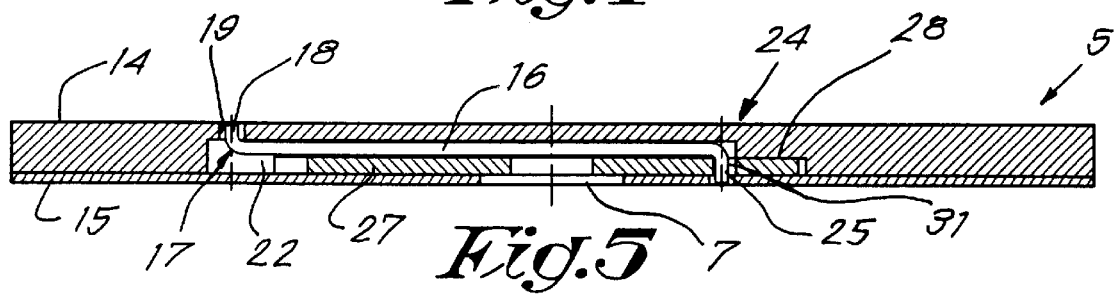
FIG. 5 represents a cross-section according to line V—V in FIG. 3.

As schematically represented in FIG. 1, the invention relates to a lens fixture 1 for removably attaching a lens 2 in an apparatus 3, more particularly, in a projector.

By means of FIGS. 2 to 10, hereafter a first preferred form of embodiment is described.

Figure 9:
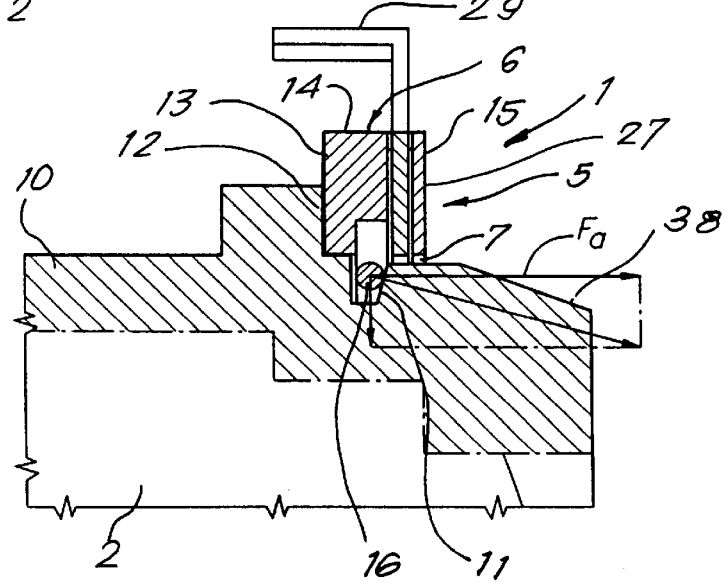
Figure 11:
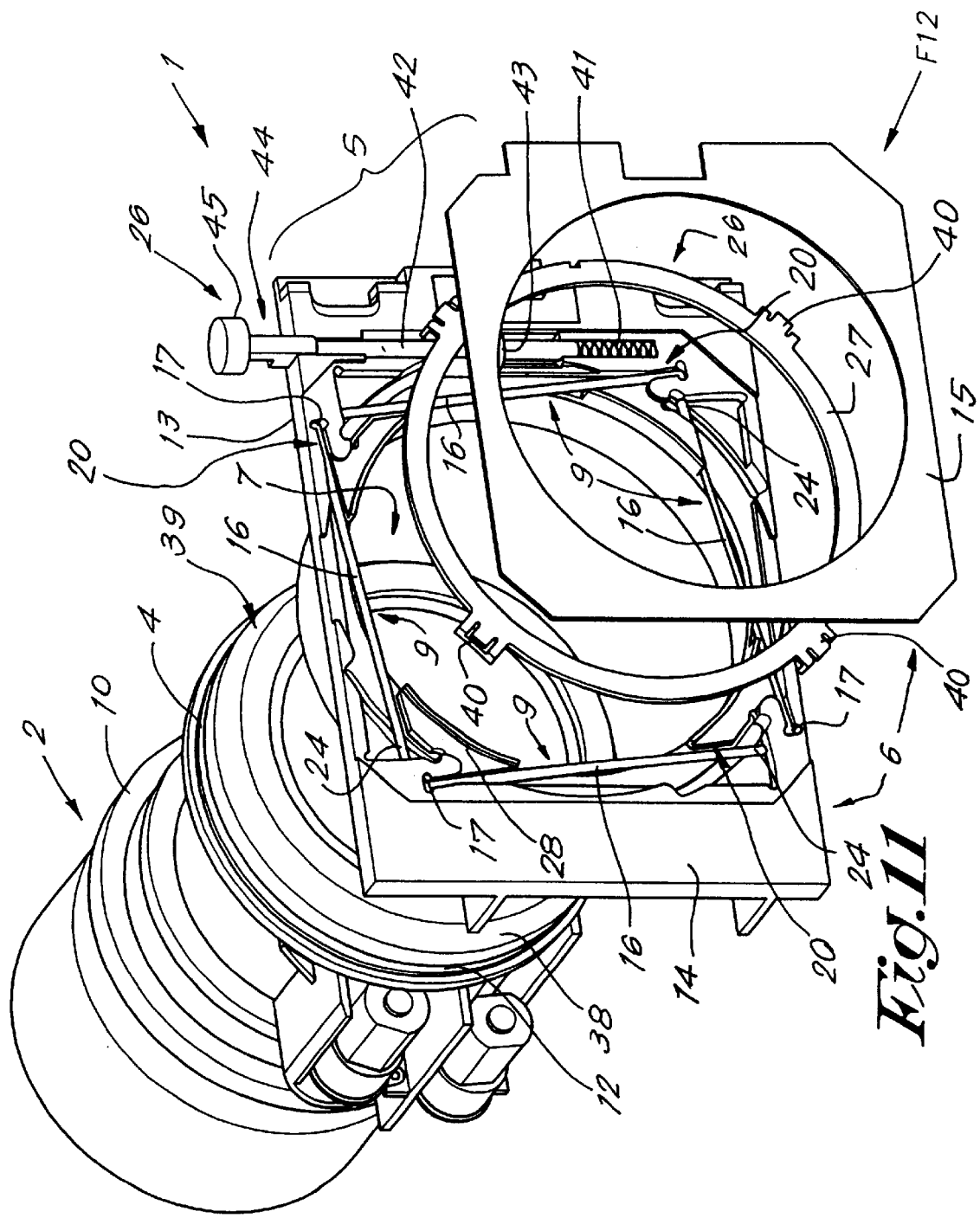
FIG. 11 represents a view analogous to that of FIG. 2, however, for another form of embodiment.
Figure 16:
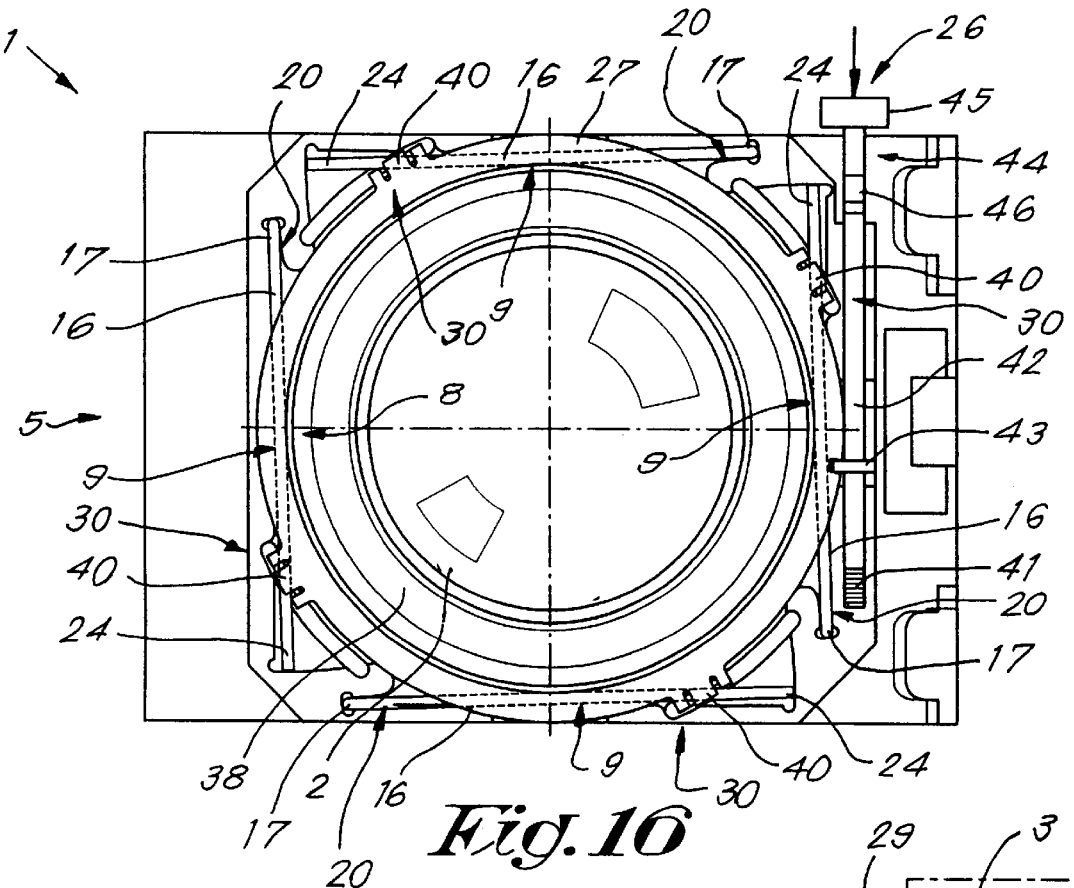
FIG. 16 represents a view similar to that of FIG. 12, however, for another position.

As represented in these figures, the lens fixture 1 according to the invention at least consists of, on one hand, a seat 4 at the lens 2 and, on the other hand, an attachment mechanism 5 at the apparatus 3, which mechanism 5 is composed of at least a carrier structure 6 with an opening 7 for providing the lens 2 therein, and an elastically working pressing system 8 comprising at least one substantially radially movable pressing element, however, in this example four of such pressing elements 9, which, as further explained in the following, can cooperate with said seat 4 of the lens 2 and, in coupled condition of the lens 2, exert a permanent axial pressure force onto this latter, as indicated by force Fa in FIG. 9.

Figure 7:
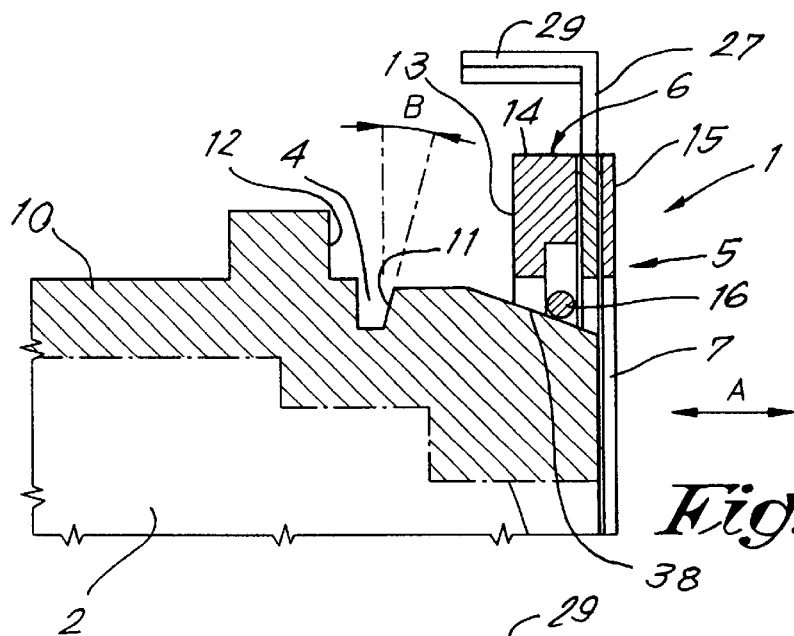
FIG. 7, at a larger scale, represents a cross-section according to line VII—VII in FIG. 3, at the moment when a lens 2 is provided.
Figure 8:
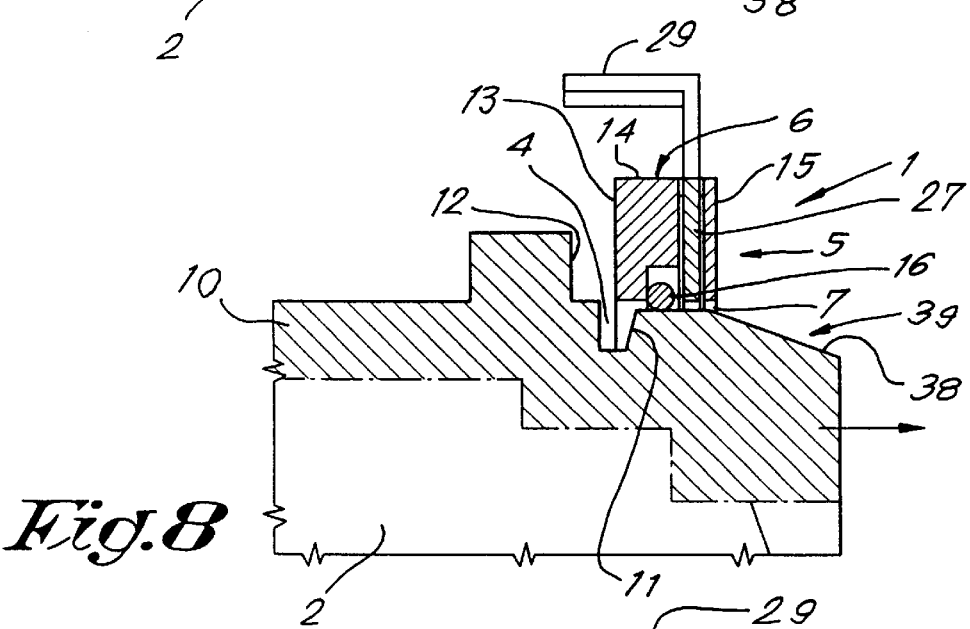
FIGS. 8 and 9 represent views analogous to that of FIG. 7, however, for respectively two other positions.

As represented in the FIGS. 7 to 9, the seat 4 consists of a recess provided in the housing 10 of the lens 2 which preferably extends along the entire circumference. This seat 4 shows a contact surface 11 extending in an inclined manner in respect to the axial direction A of the lens 2, whereby this contact surface 11 extends from the exterior of the recess towards the lowermost-situated point of the recess in an inclined manner away from the apparatus 3.

The contact surface 11 extends at an angle B in respect to a radial surface of the lens 2 which is smaller than the frictional angle determed by the materials and the surface condition of, on one hand, the aforementioned contact surface 11 and, on the other hand, the pressing element 9 cooperating therewith. This angle B preferably is smaller than 30° and is of the order of magnitude of 15°.

Further, a stop-forming part 12, in the shape of a protruding rim, is formed at the lens 2, which rim can cooperate with a stop-forming part 13 at the carrier structure 6 and/or the apparatus 3.

The carrier structure 6 consists of a frame-shaped element which preferably is composed of different parts, in this case a base plate 14 and a cover plate 15, in which the necessary recesses and seats are provided for taking up the different parts, such as said pressing elements 9, therein.

In the schematic representation of FIG. 1, the carrier structure 6 is mounted against the front side of the apparatus 3. It is, however, evident that according to a variant, such carrier structure 6 also can be mounted partially or entirely within the housing of the apparatus 3.

The four pressing elements 9 are provided in a rotational symmetric manner along the circumference of the opening 7. As represented in FIGS. 2 to 10, they consist of spring wires 16 which, in mounted condition, substantially extend tangential in respect to the opening 7 and the lens 2. At one extremity 17, the spring wires 16 are provided with a bent part 18 with which they are provided in an opening 19. In the carrier structure 6, also seats 20 are provided which hold the spring wires 16 clamped fast in the proximity of the starting part 21. In the represented example, these seats 20 have, on one hand, a stop surface 22 and, on the other hand, an opposed stop-forming part 23 which preferably comes into local contact with the respective spring wire 16.

Figure 3:
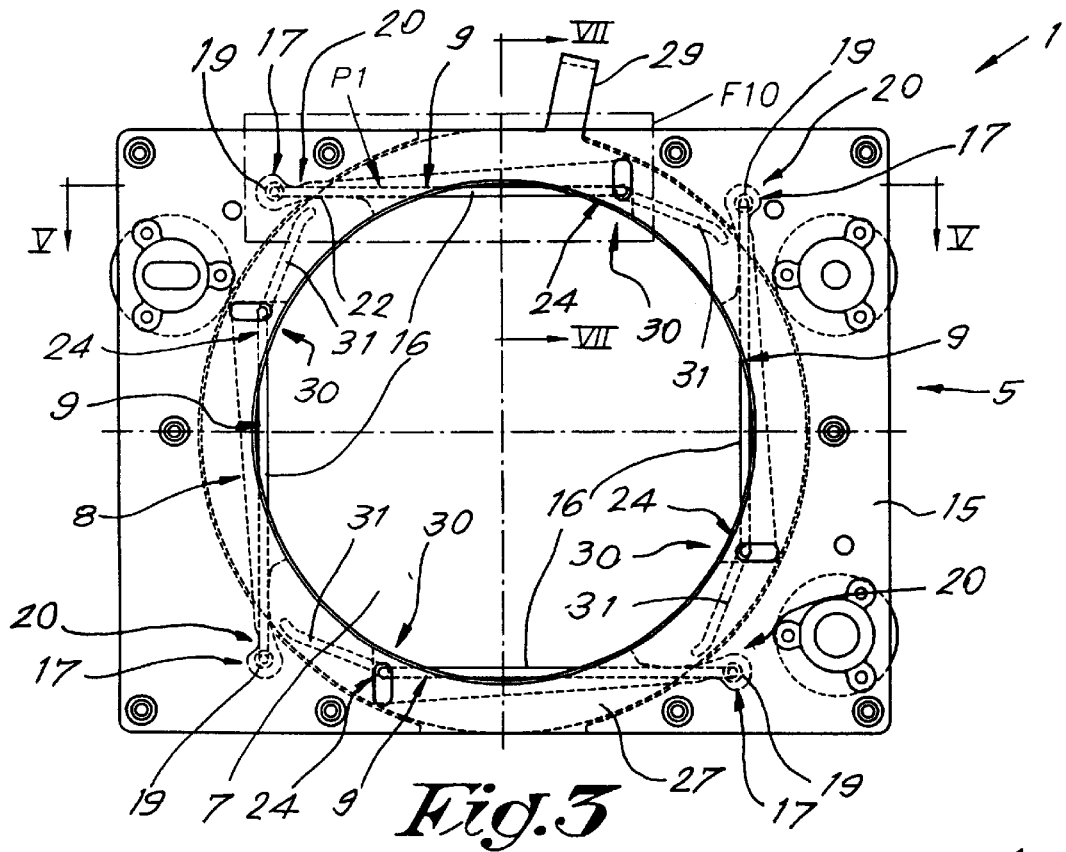
FIGS. 3 and 4, in mounted condition, represent views according to arrow F3 in FIG. 2, in an active and an inactive condition, respectively.
Figure 4:
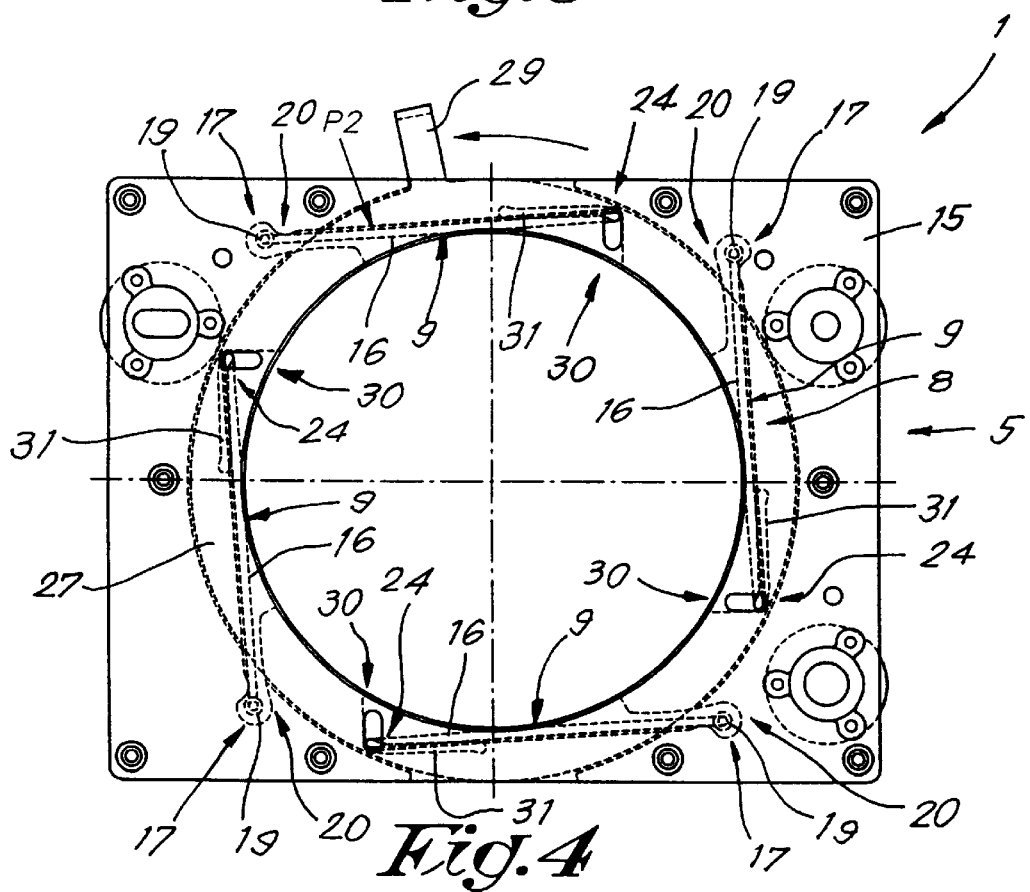

At their other extremity 24, the spring wires 16 also are provided with a bent part 25. The bent parts 25 of the respective spring wires 16 cooperate with a control mechanism 26, with which the pressing elements 9, in this case, thus, the spring wires 16, can be brought into at least two positions, to wit an active position P1, whereby, as represented in FIGS. 3 and 9, the spring wires 16 are situated in the path of the lens 2 and these spring wires 16, in any case if the lens 2 is provided in the attachment mechanism 5, exert a force upon the lens 2, and an inactive position P2, such as represented in FIG. 4, whereby the lens 2 can be removed from said opening 7.

Moreover, the control mechanism 26 comprises a movable element, in the example a rotatable ring-shaped element 27, which is seated in a seat 28 in the carrier structure 6, in this case between the base plate 14 and the cover plate 15.

Further, this element 27 is provided with means for moving it, more particularly, for rotating it, formed by a control element, in this case, a handle 29, which is attainable during the removal of the lens 2 and which possibly extends up to the exterior side of the apparatus 3.

Figure 6:
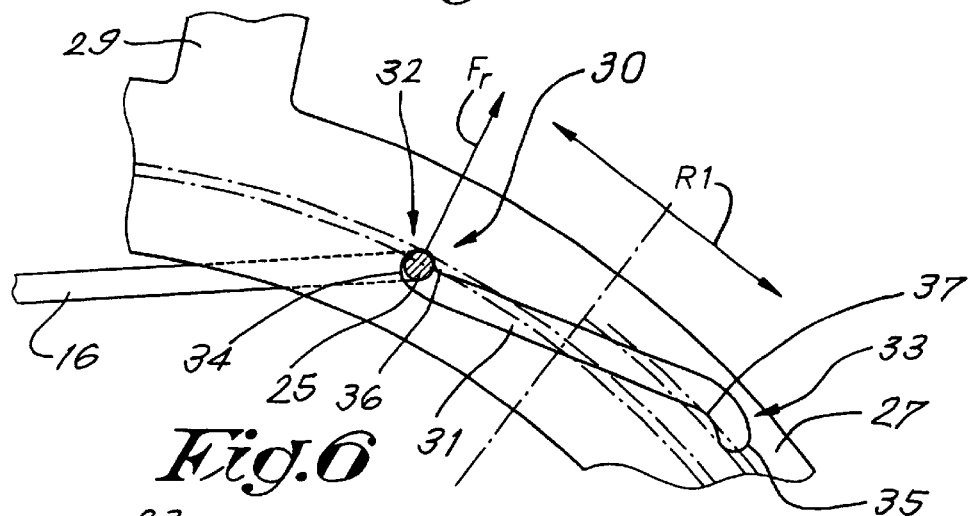
FIG. 6, at a larger scale, represents a view of the part indicated by F6 in FIG. 2.

The ring-shaped element 27 and the bent parts 25 of the spring wires 16 cooperate with each other by means of couplings 30 formed by, on one hand, slots 31 in the element 27 and, on the other hand, the fact that, in mounted condition of the whole unit, the bent parts 25 pass through these slots 31. The slots 31 are extending such that the spring wires 16 are displaced substantially radial at their extremities 24 when the element 27 is rotated. To this aim, the slots 31 are directed in an inclined manner in respect to the local tangential direction R1, more particularly such as indicated in FIG. 6.

The control mechanism 26 also comprises two overcentersystems 32–33 which hold the control mechanism 26 in the set position, such that this latter can not automatically change from one position into the other. As represented in the enlarged view of FIG. 6, these overcentersystems 32–33 are formed by bent and somewhat folded-back parts 34–35 at the end of each respective slot 31, such that, viewed according to a circular path, protruding parts 36 and 37 are formed in the respective rims of each slot 31.

Further, the whole also is provided with means which allow that the lens 2 can be snapped on in the carrier structure 6 against the force exerted by the elastically working pressing system 8. These means substantially consist in that at the extremity of the lens 2, an inclined leading surface 38 or, in other words, a conical part 39 is formed with such dimensions that, when applying the lens 2 in the aforementioned opening 7, the pressing system 8 automatically is pushed open until the spring wires 16 snap on in said seat 4.

The functioning of the lens fixture 1 substantially is as follows.

When applying the lens 2, the control mechanism 26 is put into a position as represented in FIG. 3. Thereby, the lens 2 can easily be attached in the opening 7 by sliding it axially into the attachment mechanism 5 until it snaps on.

Hereby, successively the conditions are obtained which are represented in FIGS. 7 to 9. At the beginning, the lens 2 will be sitting with the conical part 39 between the spring wires 16. By pressing the lens 2 further on, the spring wires 16 are pushed radially outward by the conical part 39, as represented in FIGS. 7 and 8. By pressing on still further, the spring wires 16 become seated in the seat 4, as represented in FIG. 9, whereby the stop-forming parts 12 and 13, at the lens 2 and at the carrier structure 6 or the apparatus 3, respectively, come into mutual contact.

Figure 10:
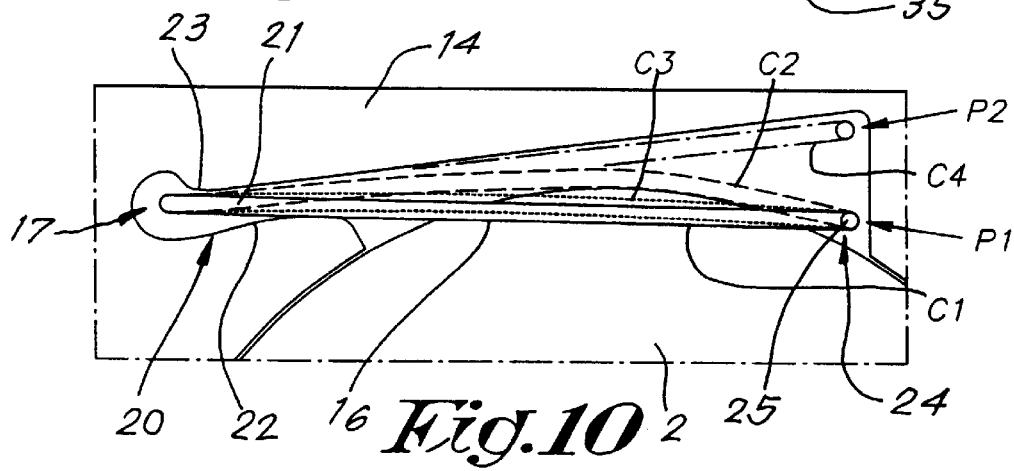
FIG. 10 schematically represents the part indicated by F10 in FIG. 3.
Figure 2:
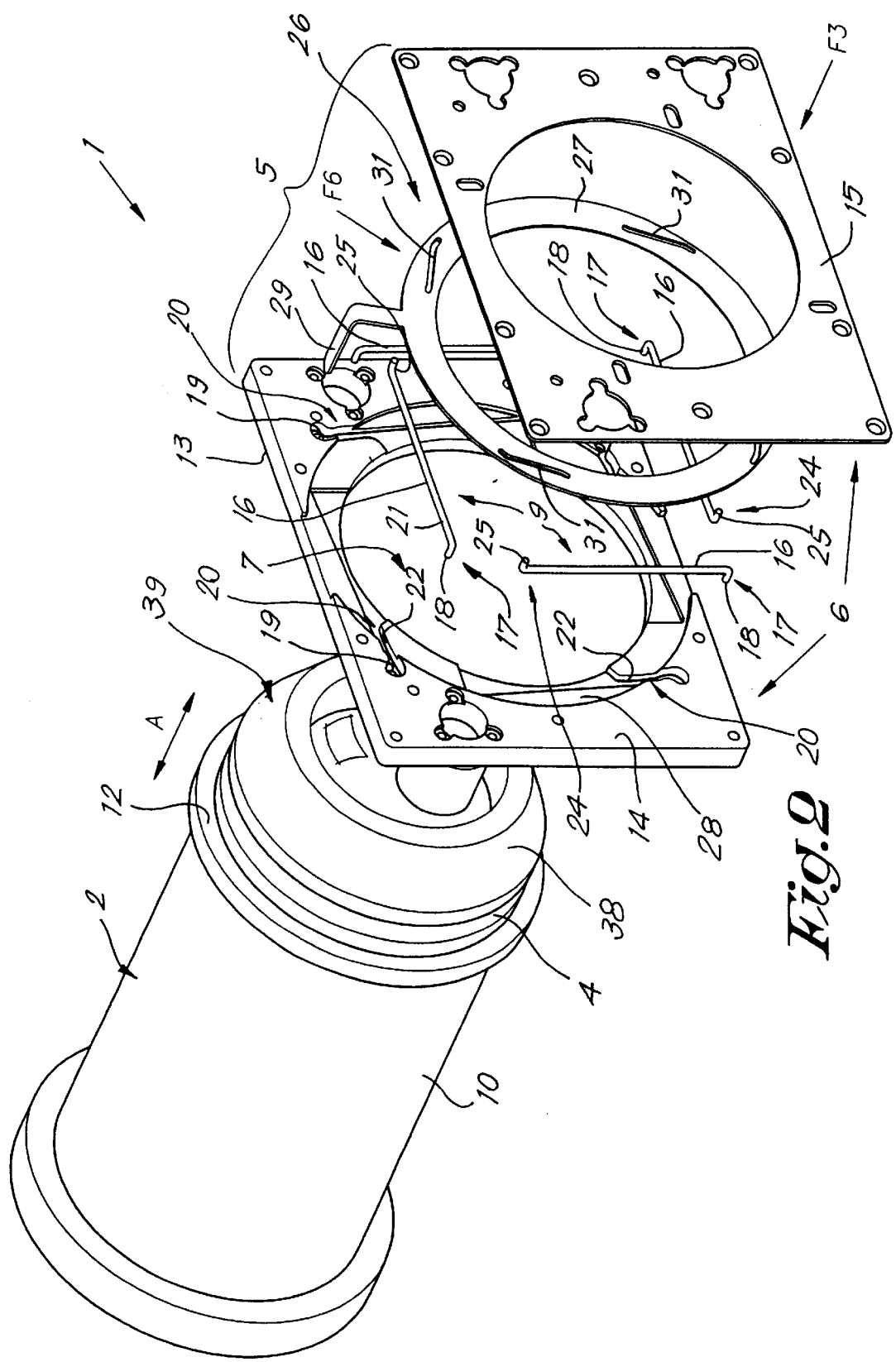
FIG. 2, in exploded view, represents a practical form of embodiment of a lens fixture according to the invention.

The position of the stop-forming means 12 and 13 and the design of the seat 4, as well as of the spring wires 16 , are chosen such that the spring wires 16 in the conditions of FIGS. 7 to 9 will behave, more particularly will bend, successively such as indicated by C1, C2 and C3 in the schematic representation of FIG. 10. Hereby, C1 shows a spring wire 16 in free condition. C2 shows the condition whereby the spring wire 16 is bent in order to allow an attachment of the lens 2, whereas C3 represents the condition of FIG. 9, in other words, the condition of the spring wire 16 at the moment that the lens 2 has been mounted.

As, in condition C3, the spring wires 16 still are bent out, a permanent tension is created which, due to the inclined contact surface 11, results in a considerable axial force component Fa, as a consequence of which the lens 2 with the stop-forming part 12 is permanently drawn against the stop-forming part 13.

As the spring wires 16, in mounted condition, are tensioned, also a force component Fr of each bent part 25 on the rim of the pertaining slot 31 will be created, such as in FIG. 6. Due to this force component Fr and the protruding part 36 of the overcentersystem 32, it is prevented that the ring-shaped element 27 revolves automatically.

As a result of the fact that the lens 2 can be snapped on in a simple manner, this lens can be gripped with both hands, without the necessity of performing other operations in the meantime.

In order to remove the lens 2, the control mechanism 26, more particularly the ring-shaped element 27, must be turned, by means of handle 29, from the position of FIG. 3 towards that of FIG. 4. Thereby, the spring wires 16 are placed into a position C4, as indicated in FIGS. 4, 9 and 10, as a result of which the lens 2 can be removed freely from in between the spring wires 16.

In FIGS. 11 to 16, a variant is represented.

In this variant, the spring wires 16 are not bent at their extremities 24, but are each seated in a bent part 40 provided at the ring-shaped element 27, as represented in FIG. 13.

Moreover, the control mechanism 26 is provided with elastic means 41, in this case, a pressure spring, which force the control mechanism 26 towards a well-defined position, in this case, said active position. To this aim, the pressure spring exerts a force onto a displacable element 42 which, by means of a protrusion 43, engages at the circumference of the ring-shaped element 27, as a result of which a force according to direction R2 is exerted thereupon.

This control mechanism 26 also comprises a locking element 44 with which the whole can be locked in active condition. This locking element is represented in FIGS. 12 and 14 in locked position, and in FIGS. 15 and 16 in unlocked position, as well as in a condition whereby the element 42 is pushed in against the force of the pressure spring. In order to operate the locking element 44, an operation button 45 is provided at the element 42, with which button the element 42 can be pressed-in. This operation button 45 is provided with a protrusion 46 which, in the highest position of the element 42, can be brought behind a rim 47 or such when being turned.

The functioning and the use of the device of FIGS. 11 to 16 substantially is similar to those described in respect to the first form of embodiment. The only difference consists in that, in order to remove the lens 2, the element 42 first has to be brought from the condition of FIGS. 12 and 14 into that of FIGS. 15 and 16, by turning the operation button 45 and pressing it. In pushed-in condition, the lens 2 can be removed freely.

It is evident that according to a not-represented variant, the elastic means 41 also can be realized such that they force the control mechanism 26 towards the nonactive condition, whereas the active condition explicitly has to be set by bringing the control mechanism 26 in such condition and locking it.

Figure 17:
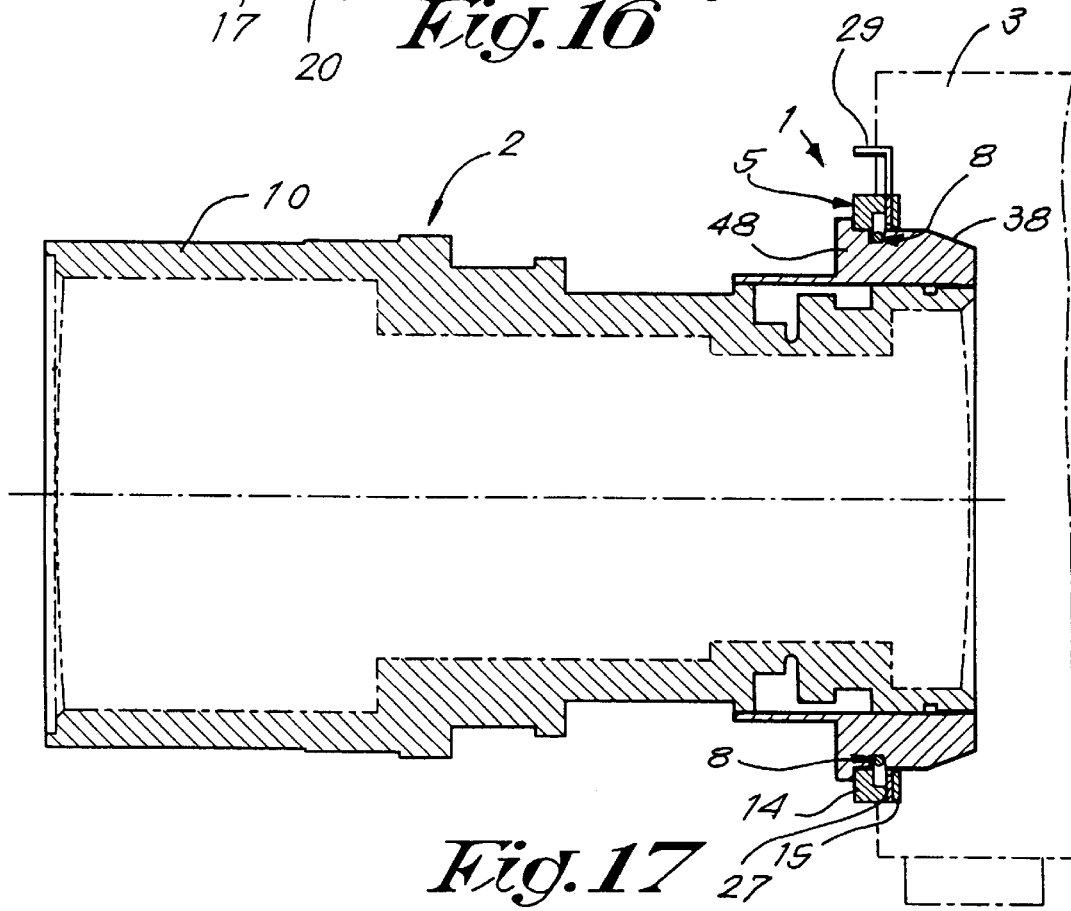
FIG. 17 represents another variant of the invention, whereby an adapter piece is used.

As represented in FIG. 17, the seat 4 according to the invention also can be provided at an adapter piece 48 in which a lens 2 can be attached in one or another way.

The present invention is in no way limited to the forms of embodiment described by way of example and represented in the figures, however, such lens fixture can be realized in different forms and dimensions without leaving the scope of the invention.

So, for example, not necessarily all pressure elements 9 must be movable. Of two opposed pressing elements 9, for example, one may consist of a rigid element, whereas the opposite is elastically movable.

Preferably, the spring wires 16 directly cooperate with the lens or the adapter piece, however, it is clear that according to an alternative of the present invention, one or more of the spring wires 16 can effect on rigid movable elements which then, by means of the spring wires 16, are urged into the seat 4.

The carrier structure 6 may also be realized in one piece with the apparatus 3.

Also, the ring-shaped element 27 does not necessarily have to be a closed ring.

The term "seat" has to be interpreted very broad, and consequently said sesat does not necessarily have to consist of a recess. By such "seat", any surface is meant upon which a force can be exerted.

What is claimed is:

1. Lens fixture for removably attaching a lens at an apparatus, which consists at least of, on one hand, a seat at the lens or at an adapter piece and, on the other hand, an attachment mechanism at the apparatus, which mechanism at least is composed of a carrier structure with an opening for providing the lens or adapter piece therein, and an elastically working pressing system comprising one or more substantially radially working pressing elements, which pressing system can cooperate with said seat of the lens, the adapter piece, respectively and, in coupled condition of the lens or the adapter piece, exerts a permanent axial pressure force onto this latter, wherein the lens fixture comprises pressing elements formed by spring wire.

2. Lens fixture according to claim 1, wherein said seat consists of one or more recesses, which either or not extend along the entire circumference of the lens or the adapter piece.

3. Lens fixture according to claim 1, wherein the seat shows a contact surface for each respective pressing element which extends at an angle in respect to a radial plane of the lens or the adapter piece which is smaller than the friction angle which is determined by the materials and the surface condition of, on one hand, the aforementioned contact surface and, on the other hand, the pressing element cooperating therewith.

4. Lens fixture according to claim 3, wherein the aforementioned contact surface extends at an angle in respect to the vertical which is smaller than 30° and preferably is of the order of magnitude of 15°.

5. Lens fixture according to claim 1, wherein several pressing elements are provided along the circumference which preferably are distributed along the circumference in a rotationally symmetrical manner.

6. Lens fixture according to claim 1, wherein the whole is provided with means which allow a snapping-on of the lens or the adapter piece in the carrier structure against the force exerted by the elastically working pressing system, whereby said means comprise at least an inclined surface and/or a conical part at one extremity of the lens or the adapter piece, such that, when providing the lens or adapter piece in the aforementioned opening, the pressing system is pushed open in order to finally snap on in said seat.

7. Lens fixture according to claim 1, further comprising stop-forming parts, on one hand, at the lens or the adapter piece and, on the other hand, at the apparatus, such that, by the intermediary of the pressing system, the lens or the adapter piece with the pertaining part is pressed axially against the apparatus and/or the carrier structure.

8. Lens fixture according to claim 1, wherein each spring wire concerned extends substantially tangential in respect to the lens or adapter piece, the opening for the lens or adapter piece, respectively.

9. Lens fixture according to claim 1, wherein the spring wire, at least in active condition, is held substantially next to two extremities and is bent out in the middle.

10. Lens fixture according to claim 1, wherein the aforementioned attachment mechanism comprises a control mechanism with which the pressing element, pressing elements, respectively, can be brought into at least two positions, to wit an inactive position whereby the lens or adapter piece can be removed from said opening, and an active position whereby, when the lens or adapter piece is provided in the attachment mechanism, the pressing element, pressing elements, respectively, exert a force upon the lens.

11. Lens fixture according to claim 10, wherein this lens fixture comprises two or more pressing elements and wherein the control mechanism comprises a ring-shaped element extending around said opening, as well as couplings between this ring-shaped element and the pressing elements, such that these can be moved by means of rotating them, and a control element for rotating the ring-shaped element.

12. Lens fixture according to claim 11, wherein the spring wires, at one extremity, are seated in a seat and, at the other extremity, cooperate with slots provided in the ring-shaped element, whereby these slots each extend in an inclined manner in respect to the local tangential direction.

13. Lens fixture according to claim 10, wherein the control mechanism comprises one or more overcentersystems which hold the control mechanism in one or both of said positions.

14. Lens fixture according to claim 10, wherein the control mechanism comprises elastic means which force the control mechanism into a well-defined position, as well comprises a locking system with which it can be locked, against the force of said elastic means, in a position in which the pressing element, pressing elements, respectively, are in one of the aforementioned positions, either the inactive position or the active position.

15. Lens fixture according to claim 10, wherein the control mechanism effects on the spring wire, the spring wires, respectively, in such a manner that these are displaced in the proximity of one extremity.

16. Lens, adapter piece for a lens, respectively, said lens or adapter piece being provided with a seat allowing that it can be attached in an apparatus, by means of a lens fixture according to claim 1.

17. Apparatus, more particularly a projector, said apparatus being provided with an attachment mechanism allowing for the fixation of a lens or an adapter piece in this apparatus by means of a lens fixture according to claim 1.

18. Lens fixture for removably attaching a lens at an apparatus, which consists at least of, on one hand, a seat at the lens or at an adapter piece and, on the other hand, an attachment mechanism at the apparatus, which mechanism at least is composed of a carrier structure with an opening for providing the lens or adapter piece therein, and an elastically working pressing system comprising one or more substantially radially working pressing elements, which pressing system can cooperate with said seat of the lens, the adapter piece, respectively, and, in coupled condition of the lens or the adapter piece, exerts a permanent axial pressure force onto this latter, wherein:

the aforementioned attachment mechanism comprises a control mechanism with which the pressing element, pressing elements, respectively, can be brought into at least two positions, to wit an inactive position whereby the lens can be removed from said opening, and an active position whereby, when the lens or adapter piece is provided in the attachment mechanism, the pressing element, pressing elements, respectively, exert a force upon the lens or upon the adapter piece; and the control mechanism comprises elastic means which force the control mechanism into a well-defined position, as well comprises a locking system with which it can be locked, against the force of said elastic means, in a position in which the pressing element, pressing elements, respectively, are in one of the aforementioned positions, either the inactive position or the active position.

* * * * *